United States Patent [19]

Finegold

[11] Patent Number: 4,817,029

[45] Date of Patent: Mar. 28, 1989

[54] MULTIPLE-PRECISION BOOTH'S RECODE MULTIPLIER

[75] Inventor: Leonard S. Finegold, Colorado Springs, Colo.

[73] Assignee: United Technologies Corporation, Hartford, Conn.

[21] Appl. No.: 48,271

[22] Filed: May 11, 1987

[51] Int. Cl.$^4$ .............................................. G06F 7/50
[52] U.S. Cl. .................................................. 364/760
[58] Field of Search ........................................ 364/760

[56] References Cited

U.S. PATENT DOCUMENTS

| | | | |
|---|---|---|---|
| 4,153,938 | 5/1979 | Ghest et al. | 364/760 |
| 4,575,812 | 3/1986 | Kloker et al. | 364/760 |
| 4,597,053 | 6/1986 | Chamberlin | 364/760 |

OTHER PUBLICATIONS

Waser, Shlomo & Flynn, Michael, "Introduction to Arithmetic for Digital Systems Designers" pp. Title page, Preface, 125–129, 131–143, CBS College Publishing, Holt and Rinehart & Winston.

Primary Examiner—David H. Malzahn
Attorney, Agent, or Firm—Eric W. Petraske

[57] ABSTRACT

An improved integrated circuit multiplier employs modified Booth's recode techniques on a portion of a multiplier word, the output of two or more such multipliers being incorporated according to the invention to eliminate a source of error associated with the prior art.

4 Claims, 3 Drawing Sheets

MULTIPLE-PRECISION BOOTH'S RECODE MULTIPLIER

TECHNICAL FIELD

The field of the invention is that of integrated circuit multipliers for performing high precision multiplication operations.

BACKGROUND ART

Booth's recode and the modified Booth's recode are well known methods of performing a multiplication using a reduced number of partial products. Conventionally, the multiplier and multiplicand are used to develop intermediate products that are added together to form the correct solution. The modified Booth's algorithm calls for the multiplier to be input to a circuit called a recode logic circuit in this application that shifts, inverts, or cancels out the multiplicand term to form partial products, depending on the value and position of a bit in the multiplier.

The method of performing the modified Booth's recode is illustrated, for example, in the text book called "Introduction to Arithmetic for Digital Systems Designers" by Waser and Flynn, published by Holt, Rinehart and Winston, New York. Conventionally, one adds a zero to the right of the least significant bit of the multiplier and, if necessary, pads the most significant bit with either zeros or ones depending on whether the number is unsigned or signed.

The known prior art relates to forming partial products within a single multiplier unit or sub-multiplier unit, the latter term being used to refer to the combination of registers and other hardware that performs the selection of partial products. The known prior art does not, however, teach one to divide a multiplier into two groups of bits and to operate on those bits in parallel simultaneously according to the modified Booth's recode to perform double precision multiplication or simply to speed up the operation.

The problem addressed by the subject invention is how to combine the results of two sub-multiplier units which carry out shifting and combining operations to form two sets of partial products that have been formed in accordance with the modified Booth's algorithm. If the two sets of partial products are added together in a straightforward manner, the result will be incorrect half the time.

In particular, the problem addressed by this invention is that of finding a circuit module that may be used in a set of identical chips to form an n-precision multiplication operation.

DISCLOSURE OF INVENTION

The invention relates to an improved multiplier unit that breaks a multipler into two or more groups of bits (called multiplier sub-groups for the purposes of this application) and operates on each of those sub-groups independently n parallel in accordance with the modified Booth algorithm. The two sets of partial products resulting from the two parallel operations are combined in a novel manner that produces a correct result in all cases.

A feature of the invention is the addition of circuit elements to a multiplier unit to test the most significant bit of a multiplier sub-group and to add the multiplicand to other partial product terms produced in the multiplier unit with an offset of two bits if the most significant bit of the multiplier sub-group is 1.

Another feature of the invention is that the correction operation is performed within a sub-multiplier chip so that connections between chips for the purpose of carrying over a correction quantity are not required.

The foregoing features and advantages of the present invention will become more apparent in light of the following detailed description of the best mode for carrying out the invention and in the accompanying drawings.

BEST MODE FOR CARRYING OUT THE INVENTION

Figure 1:
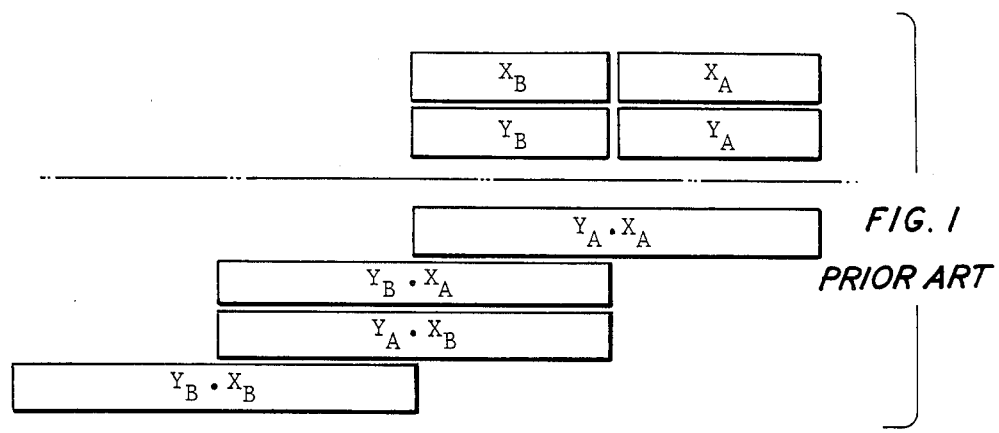
FIG. 1 illustrates a prior art multiplier unit.

FIG. 1 illustrates a prior art eight bit multiplier that incorporates four bit sub-modules labeled $X_a$, $X_b$, $Y_a$, and $Y_b$ respectively. These modules form four partial products that are offset in three different horizontal positions as shown in the diagram. The final product is formed by adding up the four partial products. Note that the partial products are simply summed, with no allowance for the correction discussed below.

Figure 2:
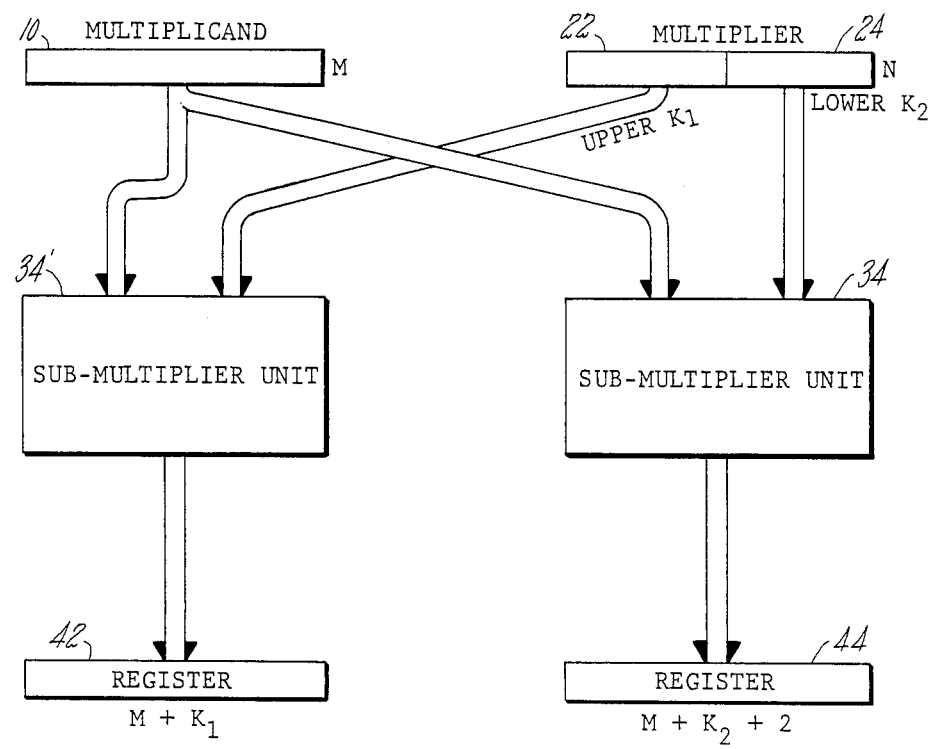
FIG. 2 illustrates schematically a diagram showing selected modules of a multiplier unit and the data flow between the modules.

Referring now to FIG. 2, there is illustrated a double precision multiplication operation. The main point illustrated in this figure is the flow of data. In the operation, a multiplicand is stored in upper register 10 and upper and lower portions of the multiplier are stored in registers 22 and 24, respectively. These portions are referred to herein as intermediate multiplier sub-groups. The double arrows in the figure illustrate symbolically that the contents of the different registers are loaded into sub-multiplication units 34 and 34' that will be described below. Note that the multiplicand is loaded into both units 34 and 34' while only one part of the multiplier is loaded into each unit. This, as is well known to those skilled in the art, results in two simultaneous operations that perform the multiplication in a shorter time than would be possible if a single large multiplier were used. Also, there is less integrated circuit area required for two small units than for one large unit. The output results from units 34 and 34' are loaded into registers 42 and 44. If the multiplicand has M bits and registers 22 and 24 are $K_1$ and $K_2$ bits in length, this register 42 will be $M+K_1$ bits long, and register 44 will be $M+K_2+2$ bits in length, as described further below. The contents of these registers may be disjoint or their contents may be added using the usual carry rules, with the two most significant bits from the lower register overlapping the two least significant bits in the upper register. No attempt is made in FIG. 2 to represent the actual layout of an integrated circuit multiplier. Those skilled in the art are aware of many options involved in sequential use of registers for different purposes, intermediate storage of partial products and economical use of silicon real estate for the shifting and adding operations that are used to perform the operations involved in multiplication. Division of the multiplier is, of course, used routinely without the modified Booth's recode. The prior art has not solved the problem of combining the result of the two separate operations stored in registers 42 and 44. As was mentioned above, if a longer product is formed according to the prior art by using register 42 as the upper portion and register 44 as the lower portion, the result will be incorrect half the time.

Figure 3:
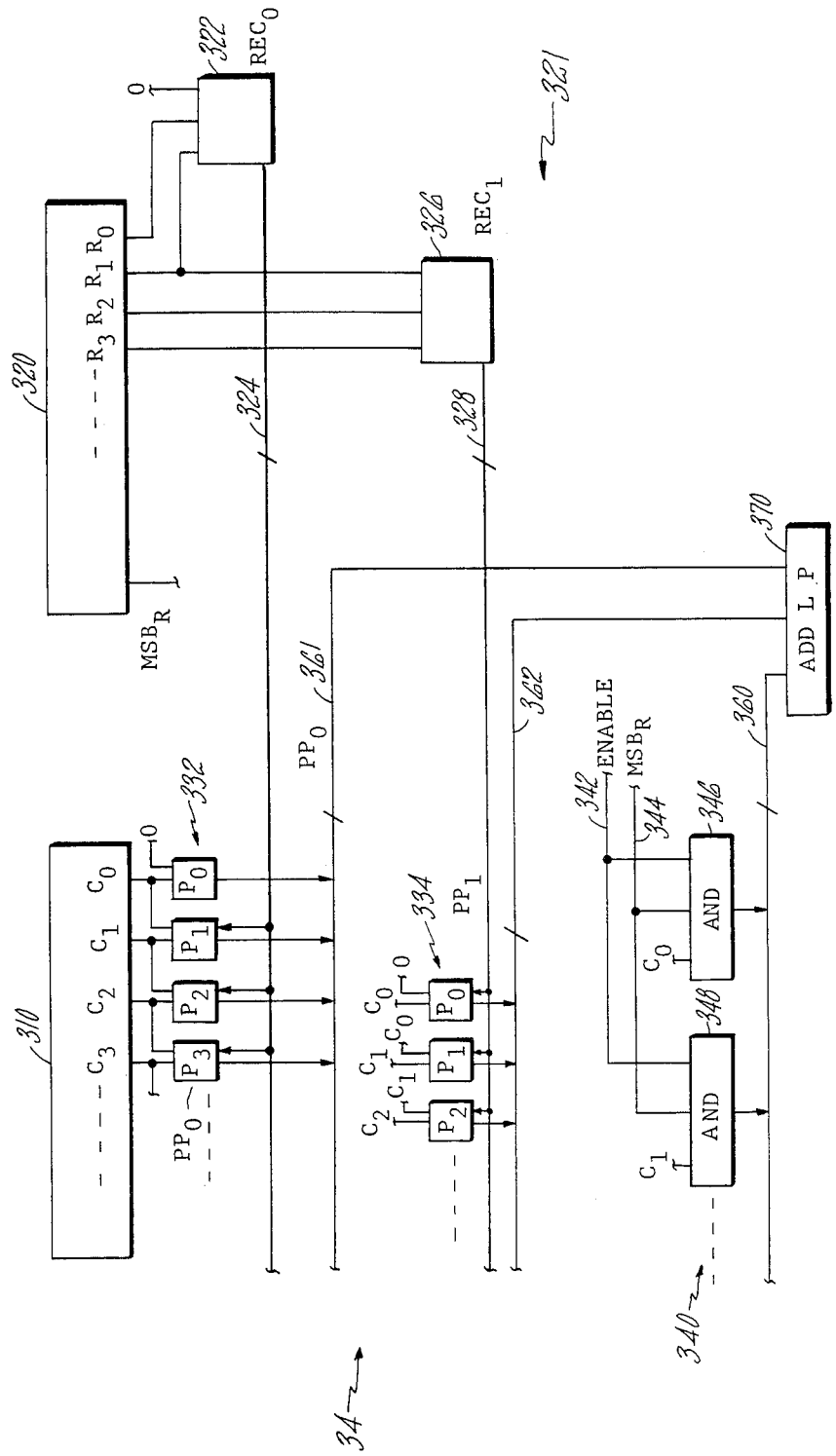
FIG. 3 illustrates a block diagram of a unit from FIG. 2.

Referring now to FIG. 3, there is shown a block diagram of sub-multiplier unit 34. In the upper left-hand corner of the drawing, register 310 holds the multiplicand. The contents of this register are labeled $C_0$, $C_1$, $C_2$, etc. In the upper right-hand corner, register 320 holds one portion of the multiplier. The contents of register 320 are referred to as $R_0$, $R_1$, etc. The most significant bit of the multiplier will be referred to as the $MSB_R$.

Below register 320 there is a set of units generally indicated by the numeral 321 that perform the recoding function of the modified Booth's recode. Each unit has three inputs, corresponding to the three bits of a Booth's recode bit group, and generates a set of control signals to select a partial product from the bits of the multiplicand.

In unit 322 labeled $REC_0$, there are three inputs. One is a zero, resulting from the conventional padding of the least significant bit with a zero according to the modified Booth's algorithm. The middle line is the least significant bit of the multiplier ($R_0$) and the left line is the second bit of the multiplier ($R_1$). Note that the second bit of the multiplier is shared with unit 326 ($REC_1$), in order to carry out the effect of the overlapping shared bit of the modified Booth's recode algorithm. These REC units produce three control signals (1X, 2X and SIGN) on control lines 324 and 328 respectively that control the operation of partial product units to be described next.

The first set of partial product units, labelled collectively with the numeral 332 and designated $P_0$, $P_1$--, operate on bits in the multiplicand under control of the signals on bus 324 to generate a partial product referred to as $PP_0$ that will have the same number of bits as are present in the multiplicand and a value that depends on the signal inputs to $REC_0$. The first partial product unit ($P_0$) has a zero as a first input in accordance with modified Booth's recode practice and $C_0$, the least significant bit of the multiplicand, as a second input. The second unit ($P_1$) has as inputs $C_0$ and $C_1$. The output data from these units travels on bus 361 to adder 370. Below partial product unit 332, there is a second partial product unit 334 that forms a second partial product in accordance with the second group of three bits from the multiplier sending its output on bus 362. Other partial product units, one for each REC unit, are indicated by a series of dots. A series of partial products is thus formed, one for each group of three bits in the multiplier according to the modified Booth's algorithm.

An additional hardware unit is shown at the bottom of the figure as correction unit 340 consisting of a number of modules 346, 348, etc., that have as a common input an enable signal, which is a fixed external signal delivered to one of the pins on the multiplier chip and set by the system designer according to whether the chip will be used for the highest order multiplier unit in the multiplication operation or as one of the lower order units. Only the highest order unit will not be enabled because it will not need the correction factor. The second line 344 is connected to the most significant bit of the multiplier in register 320. The correction will be performed if that most significant bit is a one and will not be performed if it is a zero. The last input through each sub-unit is a corresponding bit from the multiplicand $C_0$, $C_1$, etc. Modules 346, etc. are implemented by a three-input AND gate. The output from the correction units is sent to adder 370 on bus 360.

Each of the partial product units and the correction unit will be offset by two bit positions in order to combine the partial products with the correct weighting of the correct power of two. The contents of the partial product units 332, 334, --- and correction unit 340 will be summed in adder 370, each with an offset of two bit places to the left of the previous one in order to reflect the weight of the several Booth's recode sub-groups. The construction of adder 370 is conventional, well known to those skilled in the art.

Figure 4:
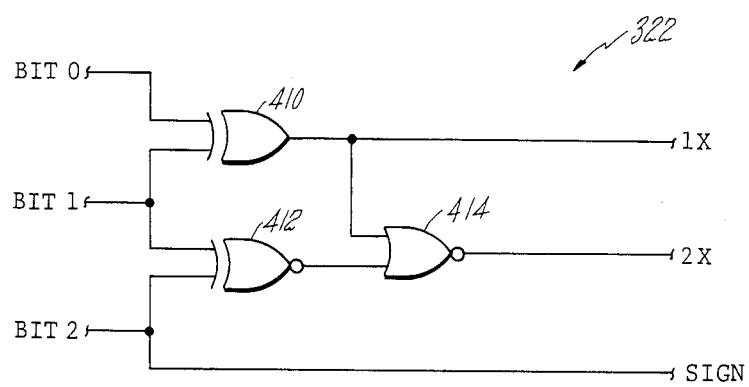
FIGS. 4-5 illustrate sub-circuits from FIG. 3.

Referring now to FIG. 4, there is shown a typical recode unit (322) from FIG. 3. The three inputs are the three bits of the group of three in the multiplier. XOR circuits 410 and 412 and OR circuit 414, with inversion indicated conventionally by a circle on the output, perform the operation. The outputs are control signals labeled 1X, 2X and SIGN to control the operation of the partial product units. 1X means that the multiplicand will be multiplied by 1; 2X means that it will be multiplied by 2; and SIGN means that the sign will be inverted.

Figure 5:
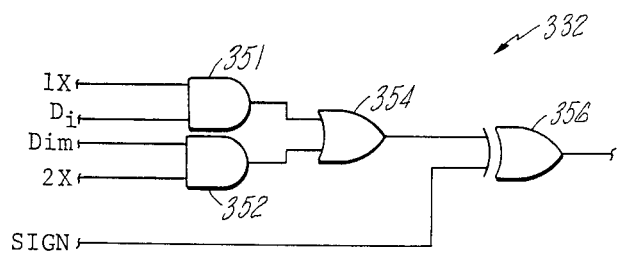

Referring now to FIG. 5, there is shown a typical partial product unit (332), having as inputs the 1X, 2X and SIGN control signals and having as data input two lines for adjacent bits in the multiplicand. Four inputs, consisting of the two multiplication control signals and the two data signals, enter two AND gates 351 and 352. The outputs of these two AND gates enter OR gate 354, the output of which enters XOR gate 356 together with the SIGN control signal to form the partial product bit from that partial product unit.

The problem addressed by the subject invention may be illustrated as follows:

$$\overline{\underset{(3)}{\underline{R_7R_6R_5R_4}}\,\underset{(1)}{\underline{R_3R_2R_1R_0}}\,0}^{\ (4)\quad\quad(2)}$$

An eight-bit multiplier R0–R7 is divided into four bit groups, referred to herein as Booth recode sub-groups according to the conventional modified Booth's recode algorithm. The lowest order group consists of bits R0 and R1, padded with a 0 on the right. Group two overlaps group one, the highest order bit of group one being the lowest order bit of group two. Similarly, group 3 overlaps group 2 and group 4 overlaps group 3.

If the multiplier is divided in half to form a double precision multiplication, there will be a lower four-bit group formed by groups one and two of the initial eight-bit multiplier and an upper four-bit group formed by groups three and four. The upper group will consist of bits R7R6R5R4 and will be padded by a lower 0 in accordance with standard Booth's recode practice. This lower 0 would be bit R3, the shared bit between groups (2) and (3), if the conventional Booth's recode on the initial undivided word were used.

Those skilled in the art will appreciate that, since the lower zero is effectively substituted for the shared bit R3, the division operation illustrated above will work correctly when the shared bit is a 0, but that there will be an error when the shared bit is a 1.

A correction could be made in a straightforward manner by testing bit R3 in this example and padding the upper group with either a 1 or a 0, depending on the value of the shared bit. That would not be attractive as a practical matter because the pinout on the integrated circuit would have to be increased. Such a multiplier would run slightly slower than the embodiment of FIG. 3, because a test would have to be made at the start of the multiplication operation in the upper multiplier. The upper multipler would thus have to wait until the information was transferred from the lower multiplier.

It is an advantageous feature of practical applications that the same chip be usable for each sub-unit. If it were necessary to have one chip for a lower portion of the word and a different chip for the upper portion, then there would be insufficient economies of scale and the cost of the chips would be higher. With this invention, a series of the same multiplier or sub-multiplier chips (or sub-units within a layer chip) may be cascaded and used for double or quadruple precision multiplication.

As described above, the partial product terms from a sub-unit are combined together and the result of the multiplier sub-units are further combined. It is a matter of choice whether separate addition units are used as part of unit 32 and 34, or whether the partial products are transferred to a common adder array that may also be used for regular addition.

Those skilled in the art will readily be able to devise alternative embodiments of the invention in the light of this disclosure. For example, the significance of 1 and 0 might be reversed. Also, a chip might have external storage for the multiplier and multiplicand on an external adder array, if that happens to be convenient. Further, the multiplier may be broken into separate groups stored in different registers or in different portions of the same register. Accordingly, the scope of the claims is not to be limited to the particular embodiment disclosed.

I claim:

1. A binary multiplier circuit for multiplying a multiplier and a multiplicand to form a product, comprising:
    recode means for dividing said multiplier into a plurality of Booth sub-groups of three bits each;
    recode logic means for operating on said multiplicand, in accordance with the binary digits of said Booth sub-groups of said multiplier, to form an intermediate set of partial products according to the modified Booth's recode algorithm;
    intermediate partial product storage means for storing said partial products; and
    adder array means for combining said partial products to form said product, characterized in that:
    said multiplier circuit further includes multiple-precision means for dividing said multiplier into at least two intermediate multiplier sub-groups of binary digits, each of which is operated on by said recode means to form two sets of Booth recode sub-groups;
    said recode logic means includes at least two recode sub-units for operating on said multiplicand in parallel to form at least two sets of intermediate partial products, each set corresponding to a multiplier sub-group and each intermediate partial product of a set corresponding to a Booth recode sub-group;
    combining means, responsive to said multiplicand and said multiplier, and connected to said intermediate partial product storage means for combining intermediate partial products, within one of said sets of intermediate partial products, that attaches an additional term of each intermediate multiplier sub-group to said set of intermediate partial products, the value of which additional term depends in a predetermined manner on said multiplicand and on the most significant bit of said intermediate multiplier sub-group.

2. A multiplier circuit according to claim 1, further characterized in that said combining means includes means responsive to a predetermined state of said most significant bit of said intermediate multiplier sub-group for setting said additional term equal to said multiplicand when said most significant bit is in said predetermined state and for setting said additional term equal to zero when said most significant bit is not in said predetermined state; and
    for attaching said additional term with a predetermined offset relative to said set of partial products.

3. A multiplier circuit according to claim 2, further characterized in that said recode means, said recode logic means, said intermediate partial product storage means, and said combining means are formed in at least two separate integrated circuit submultiplier chips, each of which is connected to said multiple-precision means, whereby at least two intermediate multiplier sub-groups may be operated on in parallel in said at least two integrated circuit chips.

4. A multiplier circuit according to claim 3, further characterized in that each of said at least two submultiplier chips includes enabling means, responsive to an enabling signal, for enabling said combining means to attach said additional term, whereby a highest-order chip of said at least two submultiplier chips may have its combining means disabled and the remainder of said at least two submultiplier chips may have their combining means enabled.

* * * * *